United States Patent [19]

Moore et al.

[11] Patent Number: 5,106,345
[45] Date of Patent: Apr. 21, 1992

[54] MOTION TRANSMISSION APPARATUS AND METHOD OF ASSEMBLY

[75] Inventors: Charles A. Moore, Spencer; Ann Kowansky, Ithaca; Robert W. Flood, Trumansburg; L. Patrick Caveney, Ithaca, all of N.Y.

[73] Assignee: NCR Corporation, Dayton, Ohio

[21] Appl. No.: 630,455

[22] Filed: Dec. 19, 1990

[51] Int. Cl.[5] .................................. F16G 7/00
[52] U.S. Cl. ............................ 474/253; 474/257; 24/33 B
[58] Field of Search ............ 474/253, 255, 257, 218; 24/31 H, 33 B, 31 L, 38

[56] References Cited

U.S. PATENT DOCUMENTS

| | | | |
|---|---|---|---|
| 369,023 | 8/1887 | Newell | 474/255 X |
| 450,901 | 4/1891 | White | 24/33 B |
| 686,711 | 11/1901 | Cain | |
| 1,472,890 | 11/1923 | Shaw | |
| 2,020,542 | 11/1935 | Freelander | 24/33 B |
| 2,171,055 | 8/1939 | Freelander | 474/257 X |
| 3,571,862 | 3/1971 | Zemek | 24/36 |
| 3,924,301 | 12/1975 | Fox | 24/31 H |
| 4,300,847 | 11/1981 | Hoffman et al. | 400/196.1 |
| 4,395,151 | 7/1983 | Krenz | 400/320 |
| 4,846,770 | 7/1989 | Lane | 474/253 |

OTHER PUBLICATIONS

IBM Technical Disclosure Bulletin, vol. 26, No. 2, Jul. 1983, "Timing Belt Termination", R. B. Schuman.

*Primary Examiner*—Rodney M. Lindsey
*Attorney, Agent, or Firm*—Albert L. Sessler, Jr.

[57] ABSTRACT

A toothed drive belt for a printer or other device is provided at each end with a slotted clip or termination which is secured in place by engaging slots therein with teeth on the belt and by wrapping the termination around the end portion of the belt. The termination includes an aperture in a portion extending outwardly from the end portions of the belt. A tensioner for retaining the belt in operative relation to associated gears or other elements includes hooks which engage the apertures in the terminations. The terminations can be assembled on the belt ends by engaging the ends of the belts with termination portions of an article including both termination portions and an interconnecting portion, bending side portions and fingers of the termination portions around the end portions of the belt, and then removing the interconnecting portion.

14 Claims, 5 Drawing Sheets

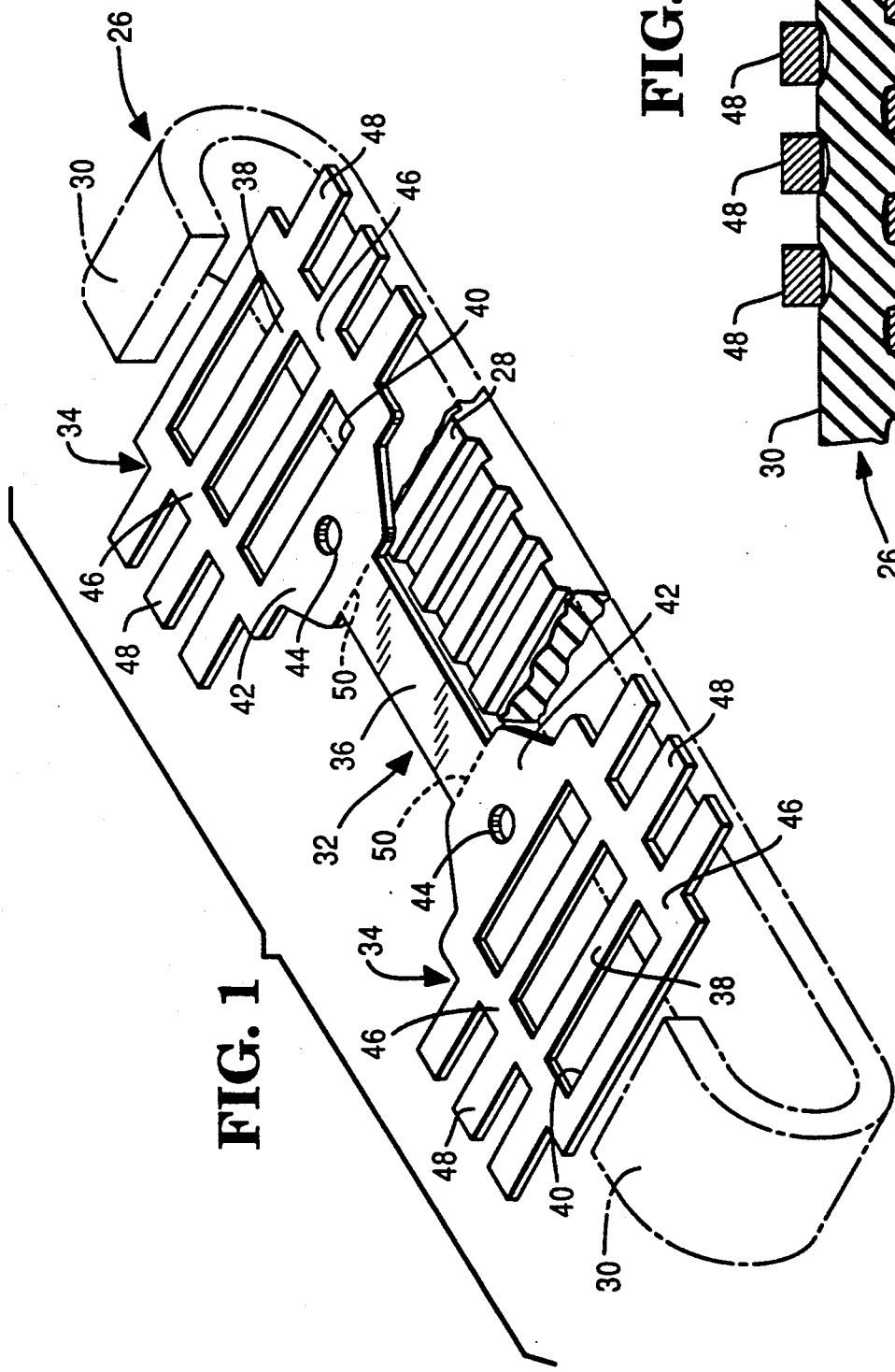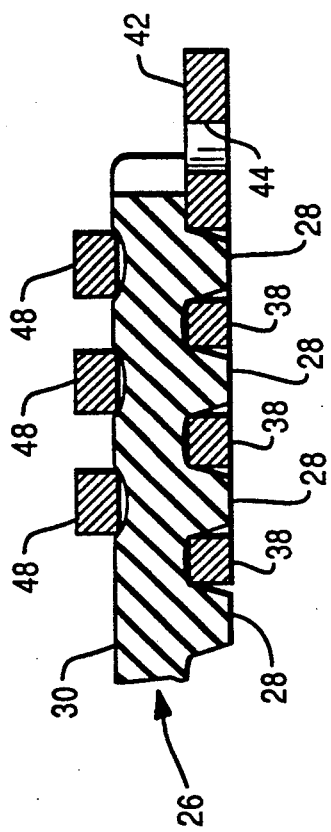

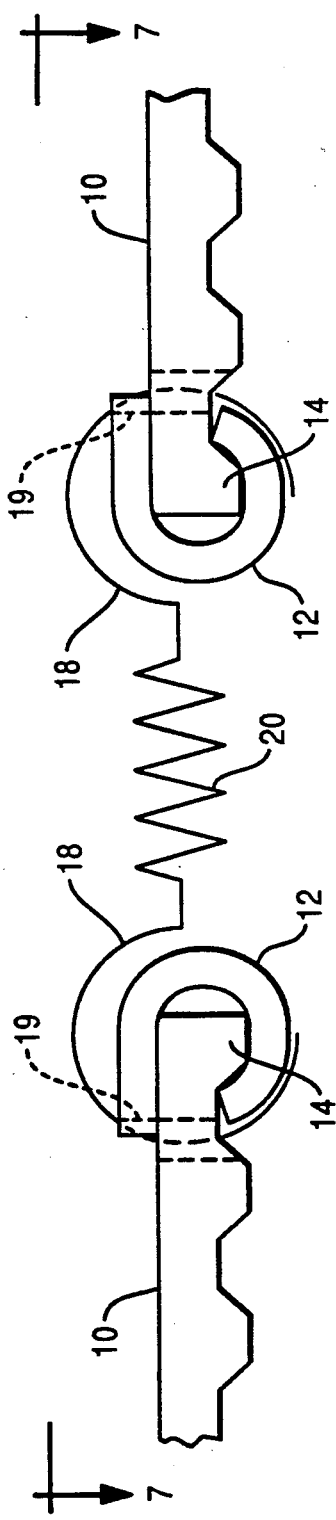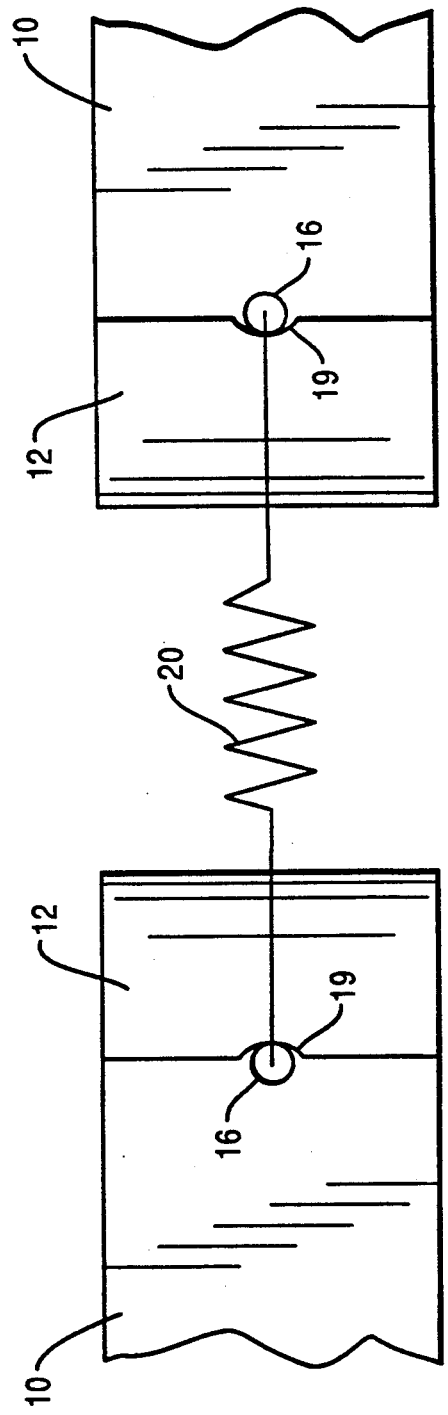

MOTION TRANSMISSION APPARATUS AND METHOD OF ASSEMBLY

BACKGROUND OF THE INVENTION

This invention relates to a motion transmission apparatus, and more particularly to a drive belt assembly, and to a method for assembling such a motion transmission apparatus.

Drive systems are currently in use that employ a flexible drive belt having two end portions, an end piece attached to each end portion, and a tensioning device between the two end portions. Such drive systems are suitable for use in a number of applications, one application being the driving of a print head in reciprocal directions in a printer, such as a dot matrix printer. However, in at least one prior art arrangement, these existing end pieces or clips provide engagement with only one tooth of the belt, which makes the belt susceptible to clip pull-off. In addition, in such an arrangement, a hole is formed in the belt adjacent to each end portion for connection of a tensioning device. This decreases the strength of the drive system. The hole location is critical because correct positioning is required in order to ensure correct operation of the drive system.

SUMMARY OF THE INVENTION

The present invention solves the problem of clip pull-off and the correct positioning of the tensioner hole in a drive belt system. The clip is easily located on the belt and will actively engage multiple teeth. It increases the load bearing capabilities of the drive system and is highly resistant to pull-off during normal assembly and operation. In addition, the apertures for connection of a tensioning device to the drive belt are provided in the clips rather than in the belt.

In accordance with one aspect of the invention, motion transmission apparatus comprises a two-ended motion transmission device bearing teeth on at least one side; a motion transmission device termination for each end of the motion transmission device comprising a body having a plurality of slots, each slot being dimensioned to engage one of the teeth of the motion transmission device; two side portions adapted to extend from the slotted portion adjacent each edge of the motion transmission device; a plurality of fingers extending from each of the side portions and adapted to be bent to engage the side of the motion transmission device opposite the side bearing the teeth; and resilient connecting means engaging each motion transmission device termination.

In accordance with a second aspect of the invention, a termination for a motion transmission device having teeth on at least one side comprises a portion having a plurality of slots, with each slot being dimensioned to receive one of said teeth; two side portions integral with said slotted portion at one side of said side portions and adapted to be bent to be perpendicular to said slotted portion to be positioned adjacent the edges of the motion transmission device; and a plurality of fingers integral with each of said side portions at a side opposite the slotted portion and adapted to be bent to be perpendicular to said side portions to engage a side of the motion transmission device opposite the side having the teeth receivable by said slots.

In accordance with a third aspect of the invention, an article of manufacture for providing terminations for a two-ended toothed motion transmission device comprises first and second oppositely disposed slotted portions, each having a plurality of slots each dimensioned to receive a tooth of the motion transmission device; first and second side portions integral with each slotted portion at one side edge of said slotted portions; a plurality of finger portions integral with each side portion and extending outwardly therefrom; and a connecting neck portion integral with one end of each slotted portion to connect the two slotted portions together.

In accordance with a fourth aspect of the invention, a method for connecting two end portions of a toothed motion transmission device, said method including the use of a fastening element having two slotted and apertured interconnected belt engaging elements with extending fingers and a resilient connector having two ends, comprises the following steps: placing each motion transmission device end portion into engagement with one of the interconnected motion transmission device engaging elements so that teeth on one side of the motion transmission device end portion fit within the slots of the motion transmission device engaging element; bending the extending fingers of each motion transmission device engaging element over the motion transmission device end portion and into engagement with the other side of the motion transmission device end portion; separating the two motion transmission device engaging elements; and engaging each end of the resilient connector with an aperture in one of the motion transmission device engaging elements.

It is accordingly an object of the present invention to provide a novel and effective system for resiliently securing together two ends of a motion transmission device.

Another object is to provide a termination for a motion transmission device, said termination providing relatively high load bearing capability for the motion transmission device, and being highly resistant to pull-off during normal assembly and operation.

Another object is to provide an article of manufacture comprising two interconnected termination devices for a motion transmission device.

Another object is to provide a method for resiliently interconnecting two end portions of a toothed motion transmission device.

With these and other objects, which will become apparent from the following description, in view, the invention includes certain novel features and combinations of parts, a preferred form or embodiment of which is hereinafter described with reference to the drawings which accompany and form a part of this specification.

BRIEF DESCRIPTION OF THE DRAWINGS

FIG. 1 is a perspective view showing a two-ended toothed driving belt and an article comprising a pair of slotted interconnected belt end pieces prior to engagement of the end pieces with the end portions of the belt.

FIG. 3 is a sectional view taken on line 3-3 of FIG. 2C, showing the manner in which the end portion of the belt is forced into a serpentine pattern by the crimping of the end piece on to the end portion of the belt.

FIG. 6 is a fragmentary elevation view of a prior art apparatus for connecting the end portions of a drive belt.

FIG. 7 is a plan view of the prior art apparatus of FIG. 6.

DESCRIPTION OF THE PREFERRED EMBODIMENT

Figure 2A:
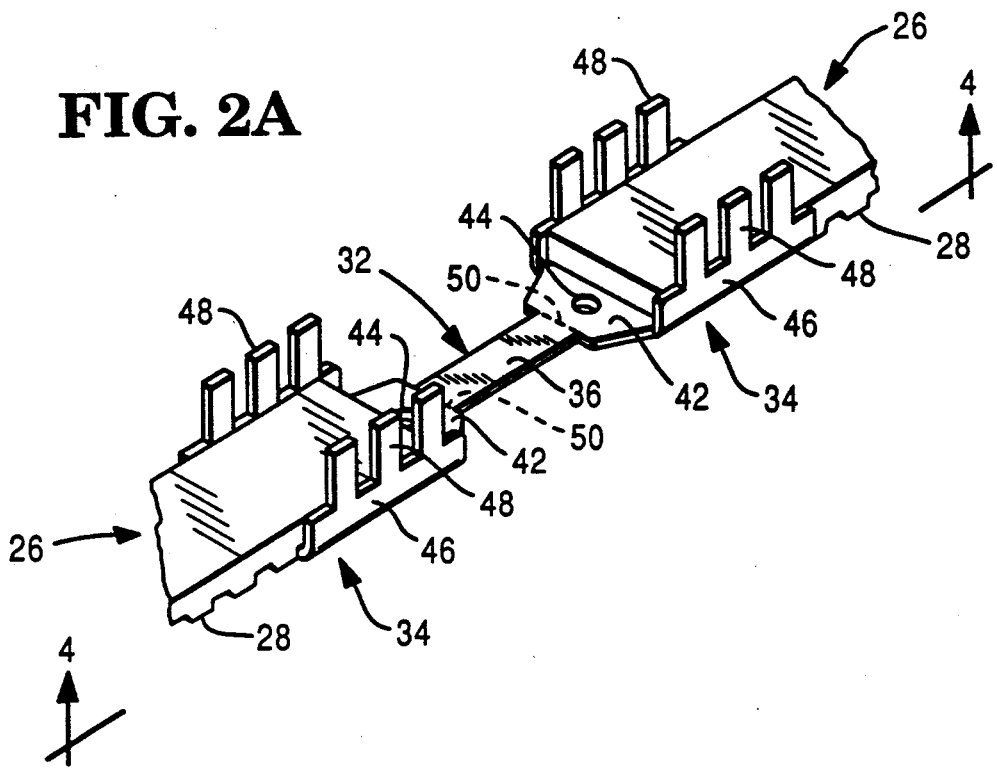
FIG. 2A is a fragmentary perspective view similar to FIG. 1 showing the driving belt end portions positioned on the end pieces so that teeth on the belt are received by slots in the end pieces.

Shown in FIGS. 6 and 7 is a prior art arrangement comprising a two-ended drive belt 10 and a clip or termination device 12 secured to each of the two ends of the belt by being slid over the belt 10 and a tooth 14 at the end of the belt, and then being crimped in place. An aperture 16 is provided adjacent to each end of the belt for receiving the hooked end 18 of a resilient tensioning device 20, which acts to hold the belt snugly in engagement with gears or other elements included in the driving mechanism during operation of the drive system.

One edge of a clip 12 includes an arcuate recess 19 which is positioned adjacent to each aperture. The clip 12 prevents the aperture 16 from pulling through to the edge of the belt 10, under tension from the resilient tensioning device 20 during operation of the drive system, and thereby ruining the belt. While the clip devices are generally adequate to retain the hooked ends 18 in position and to keep the aperture 16 from enlarging, it will be seen that the clip 12 is not positively retained in position and could be separated from the drive belt 10 either by sliding movement to the side of the belt, or by spreading apart under tension and slipping off the belt in the direction of the tensioning device 20.

Referring now to FIG. 1, shown there is a motion transmission device in the form of a drive belt 26 having a plurality of teeth 28 molded on one side thereof, while the other side 30 has no teeth in the illustrated embodiment. Also shown is an article of manufacture or stamping 32 which comprises two belt clips or termination elements 34 connected by a neck 36. It will be seen that the article 32 can be stamped from sheet metal. Each of the clips 34 includes a slotted main portion 38 in which a plurality of slots 40 have been stamped out. The slots 40 are of a size to receive the teeth 28 of the belt 26. Each clip 34 also includes a trapezoidal shaped portion 42 at one end of the main portion 38, said portion 42 having an aperture 44 extending therethrough for receiving a hook or similar element of a tensioning member. Extending from both sides of the main portion 38 are side portions 46 which may be bent up around the edges of the belt 26 when the clip 34 is engaged therewith. Extending from each of the side portions 46 is a plurality of fingers 48 which are aligned with the slots 40 in the main portion 38, and which may be bent around to engage the non-toothed side. The neck 36 is integral with both of the clips 34 and can be cut away therefrom along the dashed lines 50, as will subsequently be described.

Figure 2B:
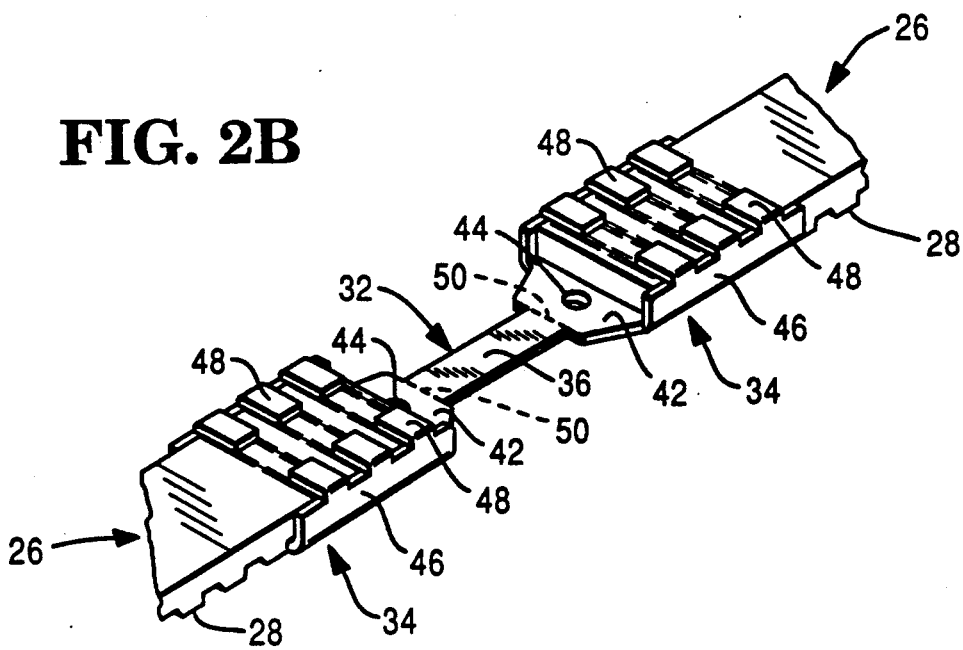
FIG. 2B is a fragmentary perspective view similar to FIG. 2A showing fingers on the end pieces bent over or crimped on the end portions of the belt.
Figure 2C:
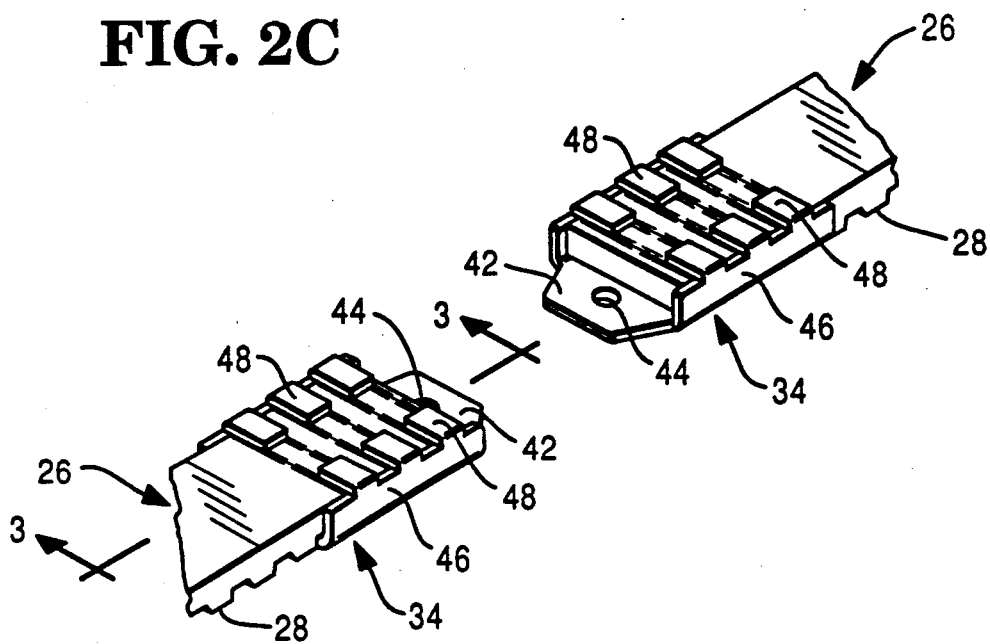
FIG. 2C is a fragmentary perspective view similar to FIG. 2B in which the neck portion interconnecting the end pieces has been removed.
Figure 2D:
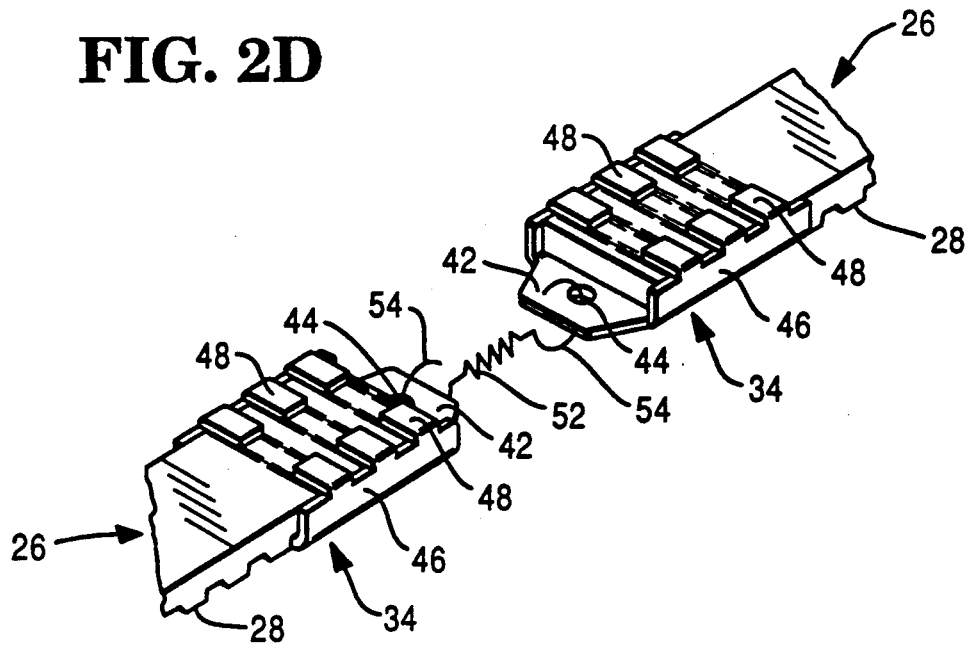
FIG. 2D is a fragmentary perspective view similar to FIG. 2C in which a resilient tensioning element has been connected to the two end pieces.
Figure 4:
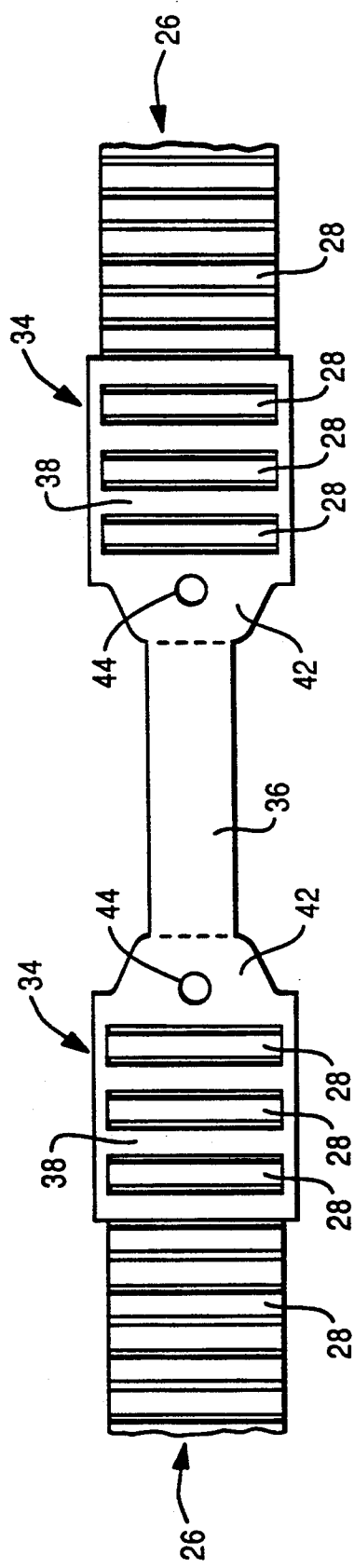
FIG. 4 is a view similar to FIG. 2A, but showing the combined belt and end pieces from the other side of the belt.

FIG. 2A illustrates the first steps in the process of assembly of the drive system. The stamping 32 is placed in a suitable fixture and the ends of the drive belt 26 are engaged with the belt clips 34 so that a plurality of the teeth 28 at each belt end are engaged in the slots 40 (FIG. 1) of the clips 34. The engaged belt 26 and article of manufacture 32 are also shown in FIG. 4, as viewed from the side of the belt 26 on which the teeth 28 are molded. The side portions 46 are then turned up to engage the edges of the ends of the belt 26. The process continues as shown in FIG. 2B, in which the fingers 48 are then turned over and crimped against the side 30 of the belt 26. Next, the connecting portion or neck 36 joining the two clips 34 is removed, to separate these elements, in a suitable manner, such as by cutting along the lines 50, as shown in FIG. 2C. Finally, the two ends of the belt 26 are connected by a tensioner, such as a spring 52 having hooked ends 54 which engage the apertures 44 in the portions 42 of the clips 34, as shown in FIG. 2D.

Figure 5:
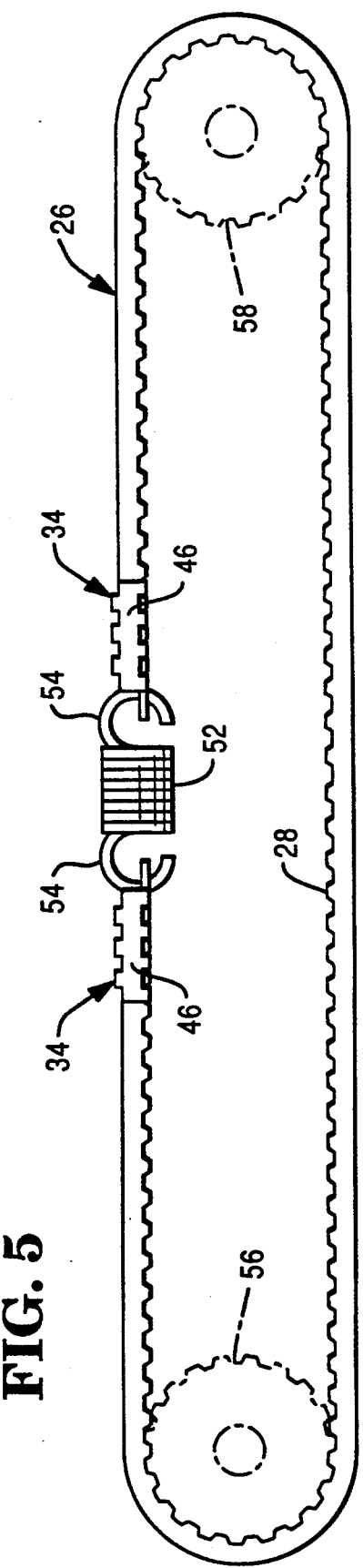
FIG. 5 is an elevation view showing the assembled motion transmission apparatus.

A drive system is thus provided which includes a belt 26 having teeth 28 adapted to engage gears such as the gears 56, 58 shown in phantom outline in FIG. 5, or other elements, in a device such as a printer. The system also includes a tensioner 52 which applies tension to the belt 26 and retains it in operative association with said gears or other elements, as shown in FIG. 5. The structure of the present invention takes any incoming load to the aperture 44 and distributes it over the teeth 28 which are engaged with the slots of the elements 34. The operation of crimping the fingers 48 on the side 30 of the belt 26 is important because it is the crimped fingers 48 opposite the teeth 28 which force the teeth to remain interlocked in the clip 34. The crimping action forces the belt 26 into a serpentine pattern (FIG. 3) which gives it added strength in the axial direction. A tensile force applied to the serpentine belt 26 will act to further lock the belt into the openings of the clip 34 and insure that proper engagement is maintained.

While the form of the invention shown herein is admirably adapted to fulfill the objects primarily stated, it is to be understood that it is not intended to confine the invention to the form or embodiment disclosed herein, for it is susceptible of embodiment in various other forms within the scope of the appended claims.

What is claimed is:

1. Motion transmission apparatus comprising:
   a two-ended motion transmission device bearing teeth on at least one side;
   a motion transmission device termination for each end of the motion transmission device comprising a body having a plurality of slots, each slot being dimensioned to engage one of the teeth of the motion transmission device, two side portions adapted to extend from the slotted portion adjacent each edge of the motion transmission device, a plurality of fingers extending from each of the side portions and adapted to be bent to engage the side of the motion transmission device opposite the side bearing the teeth; and
   resilient connecting means engaging each motion transmission device termination.

2. The motion transmission apparatus of claim 1, in which each motion transmission device termination includes an aperture adjacent its outer end to provide means for connecting the resilient connecting means to the motion transmission device.

3. The motion transmission apparatus of claim 2, in which the resilient connecting means comprises a spring element having hooked portions at each end for engaging said apertures.

4. The motion transmission apparatus of claim 1, in which each of the fingers is positioned in alignment with one of the slots, thereby causing each motion transmission device end to assume a serpentine configuration within the motion transmission device termination when said motion transmission device termination is assembled on the end of the motion transmission device.

5. The motion transmission apparatus of claim 1, in which the motion transmission device is a belt.

6. A termination for a motion transmission device having teeth on at least one side, comprising:
  a portion having a plurality of slots, with each slot being dimensioned to receive one of said teeth;
  two side portions integral with said slotted portion at one side of said side portions and adapted to be bent to be perpendicular to said slotted portion to be positioned adjacent the edges of the motion transmission device; and
  a plurality of fingers integral with each of said side portions at a side opposite the slotted portion and adapted to be bent to be perpendicular to said side portions to engage a side of the motion transmission device opposite the side having the teeth receivable by said slots.

7. The termination of claim 6, also including an aperture in each slotted portion for receiving one end of a connector for a motion transmission device.

8. The termination of claim 6, in which each of the fingers is positioned in alignment with one of the slots.

9. The termination of claim 6, in which the motion transmission device is a belt.

10. An article of manufacture for providing terminations for a two-ended toothed motion transmission device, comprising:
  first and second oppositely disposed slotted portions each having a plurality of slots each dimensioned to receive a tooth of the motion transmission device;
  first and second side portions integral with each slotted portion at one side edge of said slotted portions;
  a plurality of finger portions integral with each side portion and extending outwardly therefrom; and
  a connecting neck portion integral with one end of each slotted portion to connect the two slotted portions together.

11. The article of manufacture of claim 10 in which said slotted portion also includes an aperture adjacent the line of connection to the connecting neck portion.

12. The article of manufacture of claim 10 in which each of the fingers is positioned in alignment with one of the slots.

13. The article of manufacture of claim 10, in which said article is a stamping.

14. The article of manufacture of claim 10, in which the motion transmission device is a belt.

* * * * *

UNITED STATES PATENT AND TRADEMARK OFFICE
CERTIFICATE OF CORRECTION

PATENT NO. : 5,106,345

DATED : Apr. 21, 1992

INVENTOR(S) : Moore et al.

It is certified that error appears in the above-identified patent and that said Letters Patent is hereby corrected as shown below:

Column 5, line 24, delete "the" first occurrence.

Signed and Sealed this

Seventeenth Day of August, 1993

Attest:

BRUCE LEHMAN

Attesting Officer

Commissioner of Patents and Trademarks